(12) United States Patent
Talmaki et al.

(10) Patent No.: US 10,024,710 B2
(45) Date of Patent: Jul. 17, 2018

(54) PAYLOAD MONITORING SYSTEM

(71) Applicant: Caterpillar Inc., Peoria, IL (US)

(72) Inventors: Sanat Arun Talmaki, Peoria, IL (US); Jason Louis Smallenberger, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 787 days.

(21) Appl. No.: 14/611,519

(22) Filed: Feb. 2, 2015

(65) Prior Publication Data

US 2016/0223387 A1    Aug. 4, 2016

(51) Int. Cl.
*G01G 23/01* (2006.01)
*G01G 19/08* (2006.01)
*G06F 11/30* (2006.01)

(52) U.S. Cl.
CPC .......... *G01G 23/01* (2013.01); *G01G 19/083* (2013.01)

(58) Field of Classification Search
CPC .................................................... G01G 23/01
See application file for complete search history.

(56) References Cited

U.S. PATENT DOCUMENTS

| 5,822,224 | A | * | 10/1998 | Nakanishi | G01G 19/12 455/500 |
|---|---|---|---|---|---|
| 8,311,844 | B2 | | 11/2012 | McCaherty | |
| 8,626,541 | B2 | | 1/2014 | Doan et al. | |
| 2014/0107897 | A1 | | 4/2014 | Zhu et al. | |
| 2014/0288675 | A1 | | 9/2014 | Fujiwara et al. | |

* cited by examiner

*Primary Examiner* — Phuong Huynh
(74) *Attorney, Agent, or Firm* — Finnegan, Henderson, Farabow, Garrett & Dunner, LLP; Steve D. Lundquist

(57) ABSTRACT

A system is disclosed for monitoring payload at a worksite having multiple machines. The system may have a first sensor located onboard a haul machine and configured to generate a first signal indicative of a total amount of material in the haul machine, and a second sensor located onboard a load machine and configured to generate a second signal indicative of an amount of material being dumped into the haul machine by the load machine. The system may also have at least one controller in communication with the first and second sensors. The at least one controller may be configured to selectively perform a sensor calibration process based on a comparison of the first and second signals.

18 Claims, 3 Drawing Sheets

US 10,024,710 B2

PAYLOAD MONITORING SYSTEM

TECHNICAL FIELD

The present disclosure relates generally to a monitoring system, and more particularly, to a system for monitoring the payload of machines operating at a common worksite.

BACKGROUND

Excavation machines can be used to efficiently move large amounts of material. During movement of the material, it can be important to keep track of the amount of material moved. For example, the amount of material moved during each excavation cycle can be used in determining productivity of the excavation process or of a particular machine or operator. In another example, the material amount can aid in determining completion of a project, billing of a particular customer, and/or scheduling of the excavation machines.

The amount of material moved by an excavation machine can be determined in many different ways. For example, a loading machine can be equipped with a pressure sensor that monitors pressures in a lifting arm of the machine, the pressures then being related to the amount of material dumped into a waiting haul vehicle. In another example, a haul machine could be equipped with a strain gauge associated with a strut of the machine, a measured deflection or deformation of the strut then being related to the amount of material deposited inside the haul machine. In yet another example, the haul machine may be driven onto a scale that measures a total weight of the machine and load, the empty weight of the haul machine then being subtracted from the total weight to determine the amount of material in the machine. In a final example, the amount of material in the loading or haul machine may be calculated based on an estimated volume of the material (e.g., based on a known volume of a full work tool associated with the machine or based on a scanned volume inside the work tool) and an estimated density of the material. Unfortunately, each of these different ways of determining the amount of material being moved may produce different results and/or require different time and resources. And because multiple different systems and processes may be used at the same worksite, accuracy and consistency can be difficult to attain.

One attempt to improve payload monitoring is disclosed in U.S. Pat. No. 8,626,541 of Doan et al. that issued on Jan. 7, 2014 ("the '541 patent"). Specifically, the '541 patent discloses a system for dynamically recalibrating a payload monitoring system located onboard a loader. The system includes a scale, over which a haul machine previously filled with material by the loader travels before leaving a quarry. A measurement made by the scale is compared to a load measurement made by the payload monitoring system to create a positive or negative delta value. The delta value is compared to a threshold and, when the delta value is higher than the threshold, the payload monitoring system is recalibrated by adjusting a tare weight reading of an empty loader bucket by the delta value.

While the system of the '541 patent may have improved accuracy and consistency in some situations, it may still be less than optimal. Specifically, the system may lack broad applicability to machines other than loaders. In addition, the system may not be available at worksites that are not equipped with a scale.

The disclosed system is directed toward overcoming one or more of the problems set forth above and/or other problems of the prior art

SUMMARY

In one aspect, the present disclosure is directed to a system for monitoring payload at a worksite having multiple machines. The system may include a first sensor located onboard a haul machine and configured to generate a first signal indicative of a total amount of material in the haul machine, and a second sensor located onboard a load machine and configured to generate a second signal indicative of an amount of material being dumped into the haul machine by the load machine. The system may also include at least one controller in communication with the first and second sensors. The at least one controller may be configured to selectively perform a sensor calibration process based on a comparison of the first and second signals.

In another aspect, the present disclosure is directed to another system for monitoring payload at a worksite having multiple machines. This system may include a first sensor located onboard a haul machine and configured to generate a first signal indicative of a total amount of material in the haul machine, a first locating device configured to generate a second signal indicative of a location of the haul machine, and a first communication device associated with the haul machine. The system may also include a second sensor located onboard a load machine and configured to generate a third signal indicative of an amount of material being dumped into the haul machine by the load machine, a second locating device configured to generate a fourth signal indicative of a location of the load machine, and a second communication device associated with the load machine. The system may further include at least one controller in communication with the first and second sensors, the first and second locating devices, and the first and second communication devices. The at least one controller may be configured to establish communication between the first and second communication devices when the first and second locating devices indicate the haul machine is within a threshold distance of the load machine. The communication may include passing of information regarding specifications of the haul and load machines and information regarding a previous loading cycle. The at least one controller may be further configured to make a comparison of the total amount of material in the haul machine with the amount of material being dumped into the haul machine, and to selectively calibrate the first sensor based on the comparison and the information.

In a further aspect, the present disclosure is directed to a computer-implemented method of monitoring payload at a worksite having multiple machines. The method may comprise steps performed by one or more controllers. The steps may include sensing with a first sensor a total amount of material in a haul machine, determining a location of the haul machine, sensing with a second sensor an amount of material being dumped into the haul machine by a load machine, and sensing a location of the load machine. The steps may further include establishing communication between the haul machine and the load machine when the haul machine is within a threshold distance of the load machine, and communicating thereafter information regarding specifications of the haul and load machines and information regarding a previous loading cycle. The method may also include making a comparison of the total amount of material in the haul machine with the amount of material being dumped into the haul machine, and selectively implementing a sensor calibration process based on the comparison and the information to calibrate at least one of the first and second sensors.

DETAILED DESCRIPTION

Figure 1:
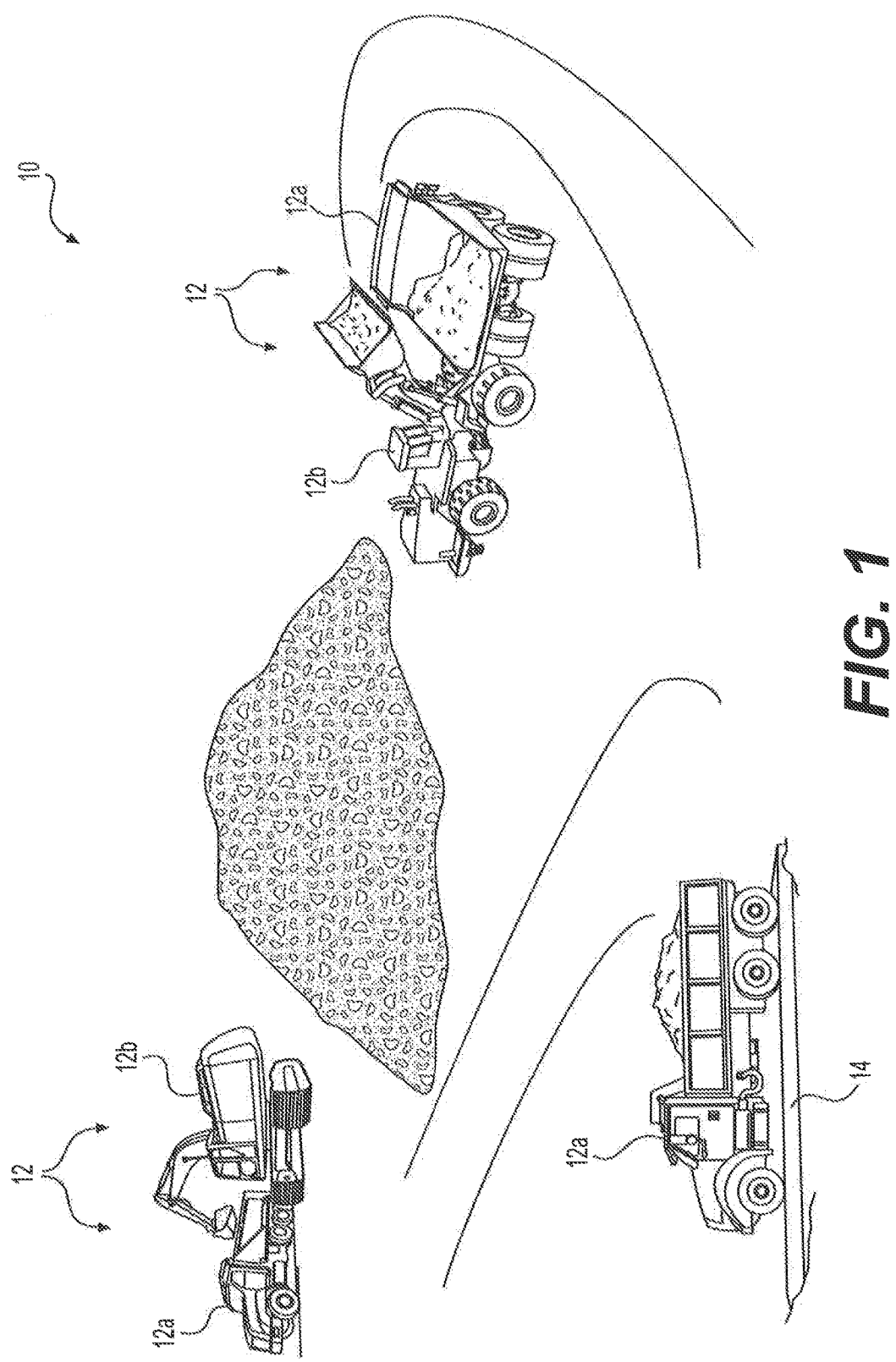
FIG. 1 is a diagrammatic illustration of an exemplary disclosed worksite.

FIG. 1 illustrates a worksite 10 and exemplary excavation machines 12 performing tasks at worksite 10. Worksite 10 may include, for example, a mine site, a landfill, a quarry, a construction site, or any other type of worksite having terrain traversable by machines 12. The tasks being performed by machines 12 may be associated with altering the geography at worksite 10, and may include a loading operation, a hauling operation, a dozing operation, a hailing operation, a grading operation, a leveling operation, a plowing operation, or any other type of operation. As machines 12 operate at worksite 10, the shapes, dimensions, and general surface contours of the terrain may change.

Two exemplary types of machines 12 are illustrated in FIG. 1, including haul machines 12a and load machines 12b. Haul machines 12a may be any type of haul machines known in the art, for example on-highway haul machines or off-highway mining or articulated haul machines. Load machines 12b may also be any type of load machines known in the art, for example loaders, excavators, front shovels, or draglines. In the illustration of FIG. 1, haul and load machines 12a, 12b are shown as cooperating during a load event, in which load machines 12b excavate earthen material and dump the material into waiting haul machines 12a for transportation away from worksite 10. In some embodiments, as haul machines 12a leave worksite 10, they may be weighed on a stationary truck scale 14 to ensure proper loading of material and/or billing of the loaded material.

In some instances, machines 12 are manned machines. In other instances, some or all of machines 12 are remotely controlled, autonomously controlled, or semi-autonomously controlled. Regardless of how machines 12 are controlled, control of machines 12 may be enhanced via a payload monitoring system 16 ("PMS"—shown only in FIG. 2). PMS 16 may be associated with some or all of machines 12, and also with scale 14 in some embodiments.

Figure 2:
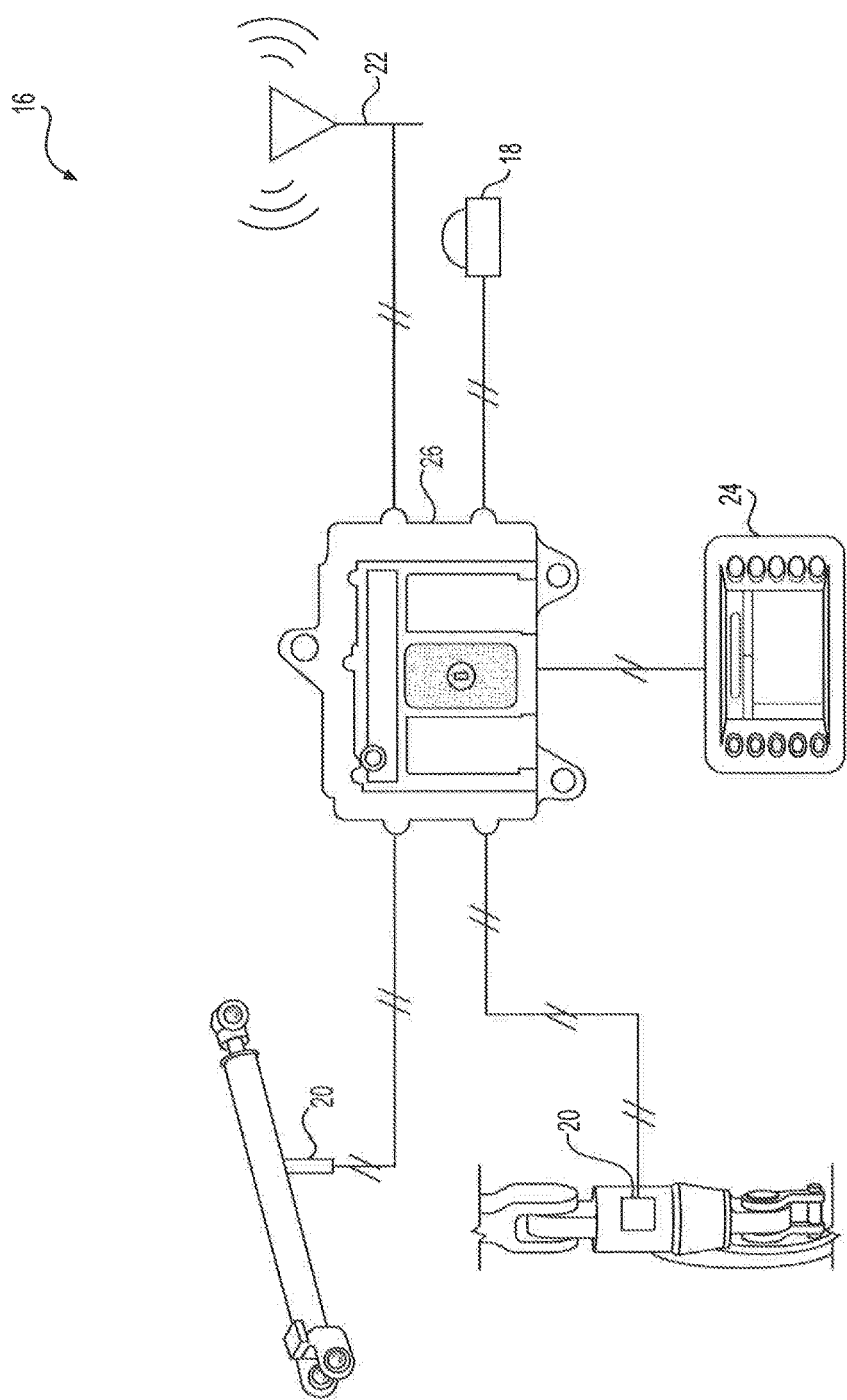
FIG. 2 is a schematic illustration of an exemplary disclosed payload monitoring system that may be used at the worksite of FIG. 1.

As shown in FIG. 2, PMS 16 may include a collection of components located onboard some or all of machines 12 (and/or scale 14) that communicate with each other to determine an amount of material loaded inside each haul machine 12a by each load machine 12b. Each of these collections may include, among other things, a locating device 18, a load sensor 20, a communication device 22, a display 24, and a controller 26 in communication with each of the other devices of the same collection, and also with controllers 26 of other machines 12.

Locating device 18 may be configured to generate a signal indicative of a geographical position and orientation of the associated machine 12 relative to a local reference point, a coordinate system associated with worksite 10, a coordinate system associated with Earth, or any other type of 2D or 3D coordinate system. For example, locating device 18 may embody an electronic receiver configured to communicate with one or more satellites, or a local radio or laser transmitting system used to determine a relative geographical location of itself. Locating device 18 may receive and analyze high-frequency, low-power radio or laser signals from multiple locations to triangulate a relative 34) geographical position and orientation. In some embodiments, locating device 18 may also be configured to determine an acceleration and/or travel speed of machine 12. Based on the signals generated by locating device 18 and based on known kinematics of machine 12, controller 26 may be able to determine in real time the position, heading, travel speed, acceleration, and orientation of machine 12.

Load sensor 20 may be any type of device known in the art for detecting and/or quantifying the amount of material inside a work tool (e.g., a bed, a bucket, a shovel, etc.) of the associated machine 12. For example, sensor 20 may embody any one or more of a load cell associated with a strut of haul machine 12a, a strain gauge associated with a support of scale 14, a pressure sensor associated with a lift arm of load machine 12b, a force gauge, or another type of load detector associated directly with the work tool or associated with an actuator that is connected to move the work tool. The signals generated by sensor(s) 20 may correspond with strain on the work tool and/or with a force applied to the work tool by the actuator. Alternatively, one or more sensors 20 may be associated with a power source (not shown) or a drivetrain (not shown) of machine 12 and configured to generate signals indicative of an amount of power used to push machine 12 against the material. Other types of sensors 20 (e.g., cameras, IR sensors, RADAR sensors, LIDAR sensors, etc.) may also be utilized to determine (e.g., to scan and/or image) the amount of material inside the work tool of machine 12.

In some embodiments, certain sensors 20 may be more accurate than other sensors 20. For example, the pressure sensor associated with the lift arm of load machine 12b may be more accurate than the load cell associated with the strut of haul machine 12a. Likewise, the strain gauge associated with scale 14 may be more accurate than the pressure sensor. Similarly, a newer or undamaged sensor 20 may be more accurate than an older or damaged sensor 20. For this reason, the type of each sensor 20 included within PMS 16, and in some embodiments also the age or condition, may be known or tracked. Likewise a history of readings taken by each sensor 20 may be recorded for the purpose of ranking the accuracy of sensors 20.

Communication device 22 may include hardware and/or software that enables sending and receiving of data messages between machines 12 and/or scale 14. The data messages may be sent and received via a wireless communication link. The wireless communications may include satellite, cellular, radio, infrared, and any other type of wireless communications that enable communication devices 22 to exchange information. The information may include, among other things, known specifications of each machine 12 (e.g., weight capacity, work tool volume, desired distribution profile, etc.), current load information, historical load information (e.g., loading total and/or distribution from a previous cycle), instructions (e.g., where to park, when to load, when loading is complete, when to leave, etc.), commands (e.g., shut down engine, restart engine, destination assignment, etc.), and/or other information known in the art.

Display 24 may include one or more monitors (e.g., a liquid crystal display (LCD), a cathode ray tube (CRT), a personal digital assistant (PDA), a plasma display, a touchscreen, a portable hand-held device, or any such display device known in the art). Display 24 may be located inside the associated machine 12, and configured to actively and responsively display information (e.g., the current load count, the current pass count, the current pass load, the total load, the previous pass count, the previous pass load, the previous total load, etc.) to the operator of machine 12. In some instances, display 24 may also be able to receive input from the operator regarding a particular truck loading event notes, observances, commands, selections, etc.), and/or to display information, instructions, and/or commands received from another machine 12.

Controller 26 may embody a single processor or multiple processors that include a means for controlling operations of PMS 16 in response to received signals. Numerous commercially available processors can be configured to perform the functions of controller 26. It should be appreciated that controller 26 could readily embody a general machine processor capable of controlling numerous functions of the associated machine 12.

The processor(s) of controller 26 may have a memory configured to store information (e.g., computer programs or code) that, when executed by the processor(s) enables the processor(s) to perform functions consistent with this disclosure. The memory may reside within one or more memory devices including, but not limited to, a storage medium such as a read-only memory (RUM), a flash memory, a dynamic or static random access memory (RAM), a hard disk device, an optical disk device, etc. The processor(s) 14 may be configured to receive data (e.g., from the operator of machine 12 via display 24, from sensor 20, from locating device 18, and/or from other machines 12 via communication device 22), and to responsively process the information stored in the memory.

Figure 3:
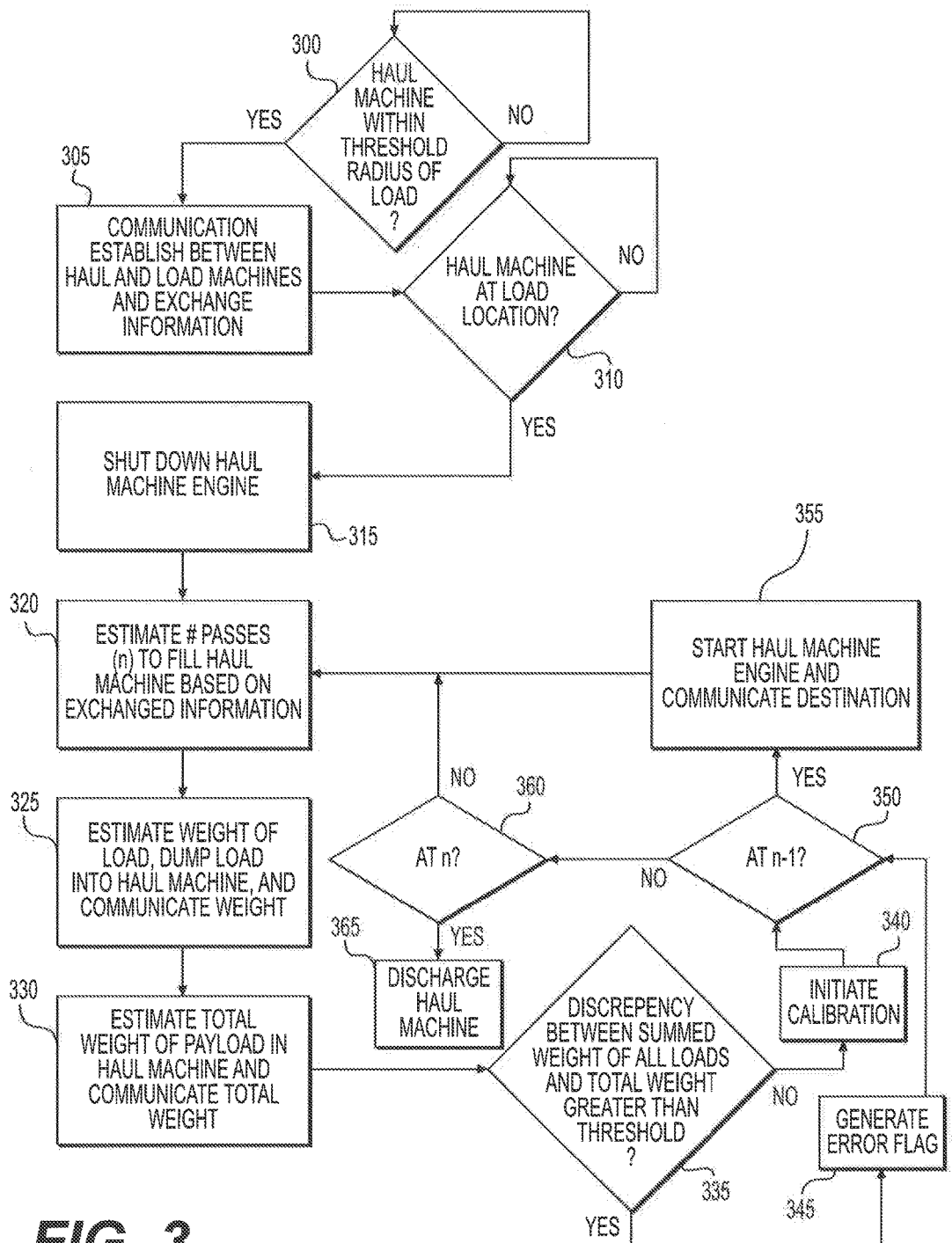
FIG. 3 is a flowchart illustrating an exemplary disclosed method that may be implemented by the payload monitoring system of FIG. 2.

FIG. 3 illustrates an exemplary payload monitoring process that may be performed by PMS 16. FIG. 3 will be discussed in detail in the following section to further illustrate the disclosed concepts.

INDUSTRIAL APPLICABILITY

The disclosed payload monitoring system may be used to accurately and consistently quantify the amount of material moved by multiple different machines operating at a common worksite. The disclosed payload monitoring system may have improved accuracy due to continuous calibration of sensors used to quantify the amount of moved material. Consistency may be improved through the use of cross-calibration between sensors and machines. Operation of PMS 16 will now be described with respect to FIG. 3.

As shown in FIG. 3, the process of payload monitoring may begin when a particular haul machine 12a approaches a particular load machine 12b at commencement of a loading event. Specifically, when haul machine 12a is within a threshold distance of load machine 12, the process may begin (Step 300). This proximity may be monitored via locating device 18 and controller 26 located onboard haul machine 12a based on a known location of load machine 12b and/or a loading area at which load machine 12b is known to operate. Once haul machine 12a is within the threshold distance of load machine 12b, controller 26 of haul machine 12a may establish communication with controller 26 of load machine 12b via the respective communication devices 22 and initiate an exchange of information (Step 305). As described above, this information may include specifications of each machine 12 (e.g., weight capacity, work tool volume, etc.), and historic loading information (previous cycle total weight, previous cycle number of passes, etc.).

As haul machine 12a continues travel toward load machine 12b, its position and/or orientation may be tracked by locating device(s) onboard haul machine 12a and/or load machine 12b. When one or both controllers 26 determine that haul machine 12a is at a desired loading location (Step 310), an instruction may be automatically generated instructing haul machine 12a to stop and instructing the engine of haul machine 12a to be shut down (Step 315). In some instances, the engine may be automatically shut down when haul machine 12a reaches the load location. The engine may be shut down to conserve fuel.

Based on the information received from haul machine 12a, controller 26 of load machine 12b may configured to determine a number of excavation passes required to fill haul machine 12a (Step 320). This determination may be made in any manner known in the art. For example, the number of passes may be based on the number of passes completed during a previous cycle, a resulting weight of the material dumped into haul machine 12a, and the known capacity of haul machine 12a. In another example, the number of passes may be calculated based on the known capacity of haul machine 12a, the volume of the work tool of load machine 12b, and an estimated density of the material. Other methods may also be used.

Load machine 12b may then initiate loading of haul machine 12a. In particular, load machine 12b may fill its associated work tool during each excavation pass, estimate the weight of the filled work tool, dump the material into haul machine 12a, and communicate the estimated weight to haul machine 12b (Step 325). The weight of the material picked up by the work tool of load machine 12b may be estimated based on signals from the associated load sensor 20 (e.g., based on a pressure sensed by the load sensor 20 associated with the lift arm of the loader or excavator). The estimated weight may be communicated from controller 26 of load machine 12b to controller 26 of haul machine 12a via communication devices 22. This step may be completed during each increment of the loading event (i.e., during each pass completed by load machine 12b).

Throughout and/or at conclusion of the loading event, haul machine 12a may independently estimate the total weight of its payload (i.e., the total weight of all of the material inside the bed of haul machine 12a), and communicate this total weight to load machine 12a (Step 330). The total weight may be estimated via, the load sensor 20 located onboard haul machine 12a, and the total weight may be communicated between controllers 26 via communication devices 22.

Controller 26 located onboard load machine 12b (and/or controller 26 of haul machine 12a) may then determine if a discrepancy between the total weight estimate and a sum of the incremental weight measurements made during each pass at step 325 is greater than a threshold amount (Step 335). It should be noted that some discrepancy between the measurements is to be expected. However, a discrepancy greater than the threshold amount may correspond with a system error (e.g., a sensor error, a communication error, a calculation error, etc.).

When the measurement discrepancy is determined at step 335 to be less than the threshold amount, a calibration process may be implemented (Step 340). The calibration process may include calibration of the sensor 20 from haul and load machines 12a, 12b known to have the lesser accuracy. In most instances, this calibration process may be implemented on sensor 20 of haul machine 12a. However, the opposite may be true in some situations. Control may advance from step 340 to step 350.

When the measurement discrepancy is determined at step 335 to be greater than the threshold amount, the calibration process may be bypassed and an error flag may be generated (Step 345). In particular, when a large discrepancy exists it may be difficult to determine what error has occurred. Accordingly, the calibration process may be bypassed so as to avoid calibrating a functional sensor with readings taken from a malfunctioning sensor. Control may advance from step 345 to step 350.

At step 350, controller 26 of load machine 12b (and/or controller 26 of haul machine 12a) may determine if the current pass is the next-to-last pass required to appropriately fill haul machine 12a. This determination may be made by counting each pass made by load machine 12b, and comparing the count to the number of passes estimated at step 320. When the current pass is the next-to-last pass, instructions may be generated to start the engine of haul machine 12a and also providing directions to a destination location (Step 355). In some instances, the engine of haul machine 12a may be automatically started in response to the instructions. Control may loop from step 355 back to step 320.

However, if it is determined at step 350 that the current pass is not the next-to-last pass, controller 26 of load machine 12b (and/or controller 26 of haul machine 12a) may determine if the current pass is the last pass (Step 360). When the current pass is the last pass, control may pass to step 365, where haul machine 12a is discharged to proceed to the assigned destination location (Step 365). When the current pass is not the last pass, control may loop from step 360 back to step 320.

In some instances, as haul machine 12a exits worksite 10, haul machine 12a may pass over scale 14. At this time, sensor 20 of scale 14 may measure a gross vehicle weight of haul machine 12a, and subtract the tare weight of haul machine 12a to determine the amount of material inside haul machine 12a. In these instances, upon returning empty to worksite 10 and approaching load machine 12b (e.g., at step 300), the information communicated between haul and load machines 12a, 12b (e.g., at step 305) may include the measurement taken by sensor 20 of scale 14. Because this measurement may be the most accurate measurement taken by all sensors 20 at worksite 10, load machine 12b may automatically implement a calibration process using this measurement before starting to load haul machine 12a.

In other instances, a particular haul machine 12a may alternate between different load machines 12b. And the sensors 20 associated with each load machine 12b may have a different accuracy. Based on the type, age, and/or history of these sensors 20, it may be beneficial to cross-calibrate the sensors 20. For example, the sensor 20 of haul machine 12a may be calibrated during a first excavation event based on signals generated by a more accurate load machine sensor 20. Then during a subsequent loading event with a different load machine 12b, the signals from sensor 20 of haul machine 12a may be used to calibrate sensor 20 of the different load machine 12b. In other words, the more accurate load machine sensor 20 may calibrate the less accurate load machine sensor 20, by way of the least accurate sensor 20 that is mounted on haul machine 12a.

In yet another instance, when haul machine 12a alternates between different load machines 12b, one of load machines 12b could be an uninstrumented machine. That is, the one load machine 12b may not include PMS 16. In this instance, haul machine 12a is first calibrated via interaction with a load machine having PMS 16, haul machine 12a may then determine a loading profile of the uninstrumented haul machine 12b during a subsequent load event. From then on, that loading profile may be used to fill the same or an uninstrumented haul machine 12a with improved accuracy.

It will be apparent to those skilled in the art that various modifications and variations can be made to the system described above. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for monitoring payload at a worksite having multiple machines, the system comprising:
   a first sensor located onboard a haul machine and configured to generate a first signal indicative of a total amount of material in the haul machine;
   a second sensor located onboard a load machine and configured to generate a second signal indicative of an amount of material being dumped into the haul machine by the load machine; and
   at least one controller in communication with the first and second sensors and configured to selectively perform a sensor calibration process based on a comparison of the first and second signals;
   wherein the at least one controller is configured to perform the sensor calibration process throughout a loading event based on a change in the first signal generated during increments of the loading event and based directly on the second signal generated during each of the increments.

2. The system of claim 1, wherein:
   the at least one controller includes a first controller located onboard the haul machine, and a second controller located onboard the load machine;
   the first controller is configured to determine the total amount in the haul machine; and
   the second controller is configured to determine the amount of material being dumped into the haul machine by the load machine.

3. The system of claim 2, further including a communication device associated with each of the haul machine and the load machine, wherein:
   the communication devices of the haul and load machines are configured to communication information regarding specifications of the haul and load machines; and
   the sensor calibration process is further implemented based on the specifications.

4. The system of claim 3, wherein:
   the communications devices of the haul and load machines are further configured to communicate information regarding a previous loading cycle; and
   the sensor calibration process is further implemented based on the information.

5. The system of claim 4, wherein the information includes a payload estimation made by another machine at the worksite.

6. The system of claim 5, wherein the another machine includes a stationary scale.

7. The system of claim 4, further including a locating device associated with the haul machine, wherein at least one of the specifications and the information is communicated when the locating device indicates the haul machine is within a threshold distance of the load machine.

8. The system of claim 7, wherein:
   the haul machine includes an engine; and a command is generated to shut the engine down when the locating device indicates the haul machine is at a desired loading location.

9. The system of claim 8, wherein a command is generated to restart the engine when the load machine has dumped a next-to-last load of material into the haul machine during a loading event.

10. The system of claim 1, wherein, during the sensor calibration process, only the first sensor is calibrated.

11. The system of claim 10, wherein the first and second sensors are different types of sensors.

12. The system of claim 11, wherein the second sensor is a more accurate type of sensor than the first sensor.

13. The system of claim 10, wherein the at least one controller is further configured to:
make a comparison of the total amount of material in the haul machine at an end of a load event with an amount of material determined to have been loaded into the haul machine throughout the load event; and
selectively generate an error flag when the comparison indicates a difference by at least a threshold amount.

14. The system of claim 10, wherein:
the load machine is a first load machine;
the worksite further includes a second load machine, the second load machine being an uninstrumented machine; and
the at least one controller is further configured to determine a loading profile of the second load machine based on the first signal after completion of the sensor calibration process.

15. The system of claim 10, wherein:
the load machine is a first load machine;
the worksite further has a second load machine equipped with a third sensor configured to generate a signal indicative of an amount of material being loaded into the haul machine by the second load machine; and
the at least one controller is configured to:
determine which one of the second and third sensors has a higher accuracy; and
selectively complete the sensor calibration process based on signals generated from the one of the second and third sensors having the higher accuracy.

16. The system of claim 1, wherein the at least one controller is further configured to selectively determine a dump location for the haul machine based on the total amount of material in the haul machine.

17. A system for monitoring payload at a worksite having multiple machines, the system comprising:
a first sensor located onboard a haul machine and configured to generate a first signal indicative of a total amount of material in the haul machine;
a first locating device configured to generate a second signal indicative of a location of the haul machine;
a first communication device associated with the haul machine;
a second sensor located onboard a load machine and configured to generate a third signal indicative of an amount of material being dumped into the haul machine by the load machine; and
a second locating device configured to generate a fourth signal indicative of a location of the load machine;
a second communication device associated with the haul machine; and
at least one controller in communication with the first and second sensors, the first and second locating devices, and the first and second communication devices, the at least one controller being configured to:
establish communication between the first and second communication devices when the first and second locating devices indicate the haul machine is within a threshold distance of the load machine, the communication including passing of information regarding specifications of the haul and load machines and information regarding a previous loading cycle;
make a comparison of the total amount of material in the haul machine with the amount of material being dumped into the haul machine; and
selectively calibrate the first sensor based on the comparison and the information.

18. A computer-implemented method of monitoring payload at a worksite having multiple machines, the method comprising the following steps performed by one or more controllers:
sensing with a first sensor a total amount of material in a haul machine;
determining a location of the haul machine;
sensing with a second sensor an amount of material being dumped into the haul machine by a load machine;
sensing a location of the load machine;
establishing communication between the haul machine and the load machine when the haul machine is within a threshold distance of the load machine, and communicating thereafter information regarding specifications of the haul and load machines and information regarding a previous loading cycle;
making a comparison of the total amount of material in the haul machine with the amount of material being dumped into the haul machine; and
selectively implementing a sensor calibration process based on the comparison and the information to calibrate at least one of the first and second sensors.

* * * * *